Apr. 10, 1923.
H. WALLACE
WHEEL HUB AND AXLE CONSTRUCTION
Filed Oct. 18, 1919
1,451,244
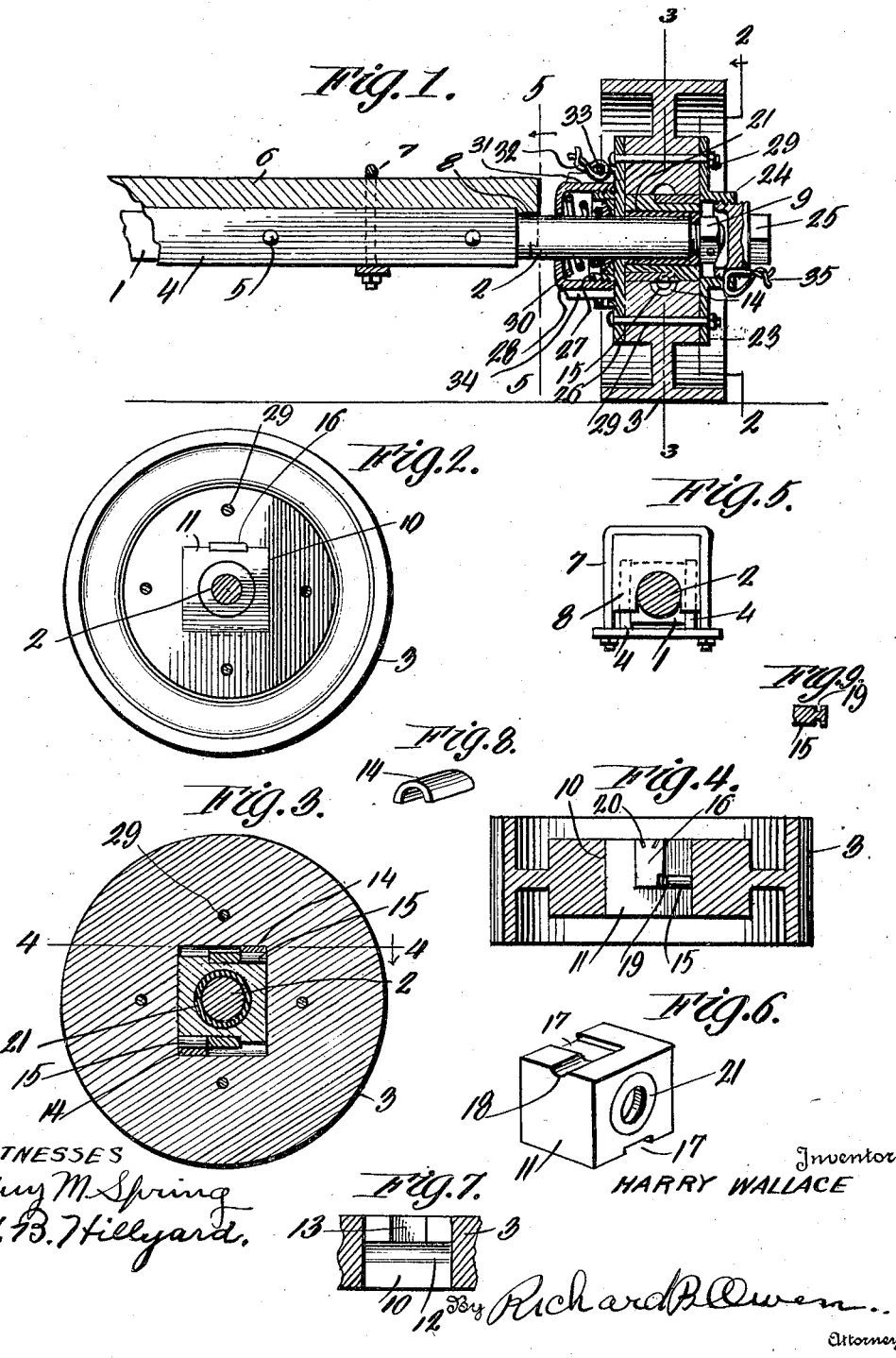

Patented Apr. 10, 1923.

1,451,244

UNITED STATES PATENT OFFICE.

HARRY WALLACE, OF NEWARK, NEW JERSEY.

WHEEL HUB AND AXLE CONSTRUCTION.

Application filed October 18, 1919. Serial No. 331,558.

*To all whom it may concern:*

Be it known that I, HARRY WALLACE, a citizen of the United States, residing at Newark, in the county of Essex and State of New Jersey, have invented certain new and useful Improvements in Wheel Hub and Axle Construction, of which the following is a specification.

The primary object of the invention is the provision of means whereby a wheel may be secured to the spindle of an axle in such manner as to preclude its casual displacement and yet admit of its ready removal when required.

A further purpose of the invention is to devise a construction whereby the wearing surfaces may operate in oil thereby reducing the friction and wear to the smallest amount possible and at the same time preventing the escape of the lubricant which is objectionable because of waste and the liability of the same to soil anything that may come in contact therewith.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

Referring to the accompanying drawings:—

Figure 1 is a vertical central section of a vehicle wheel illustrating the application of the invention and showing a portion of the axle and spindle in full lines.

Figure 2 is a section on the line 2—2 of Fig. 1, looking to the left as indicated by the arrow.

Figure 3 is a section on the line 3—3 of Fig. 1,

Figure 4 is a horizontal section on the line 4—4 of Fig. 3.

Figure 5 is a detail section on the line 5—5 of Fig. 1 looking to the left as indicated by the arrow.

Figure 6 is a detail perspective view of the box which is adapted to be detachably fitted to the hub portion of the wheel.

Figure 7 is a detail view of a portion of the wheel showing more clearly the ways formed therein.

Figure 8 is a detail perspective view of a locking pin seat.

Figure 9 is a detail view of the end portion of the locking pin provided with the annular groove.

Corresponding and like parts are referred to in the following description and indicated in the several views of the drawings, by like reference characters.

The axle 1 is provided with the usual spindle 2 which is adapted to receive the wheel 3. The axle is reinforced at opposite sides by bars 4 which are secured thereto by suitable fastenings 5. A bar 6 is placed upon the axle and overlaps the upper edges of the reinforcing bars 4 and is secured thereto by means of a clip 7. The end of the bar 6 depends as shown most clearly at 8 and is notched in its lower edge to receive the spindle or axle arm 2. This is shown most clearly in Fig. 5. The end of the spindle or arm 2 is reduced and threaded to receive a nut 9 which serves to secure the wheel in proper position.

The hub portion of the wheel 3 is formed with a square opening 10 which receives the axle box 11 which in appearance consists of a block of cubical form. The axle box is detachably fitted in the opening 10 and is retained in position by suitable fastening means. The inner and outer faces of the box 11 come flush with corresponding sides of the hub portion of the wheel. One of the walls of the opening 10 is formed with a way 12 which is in the plane of the wheel and preferably disposed midway between the sides thereof. A lateral way 13 extends from the way 12 through a side of the hub portion of the wheel. The two ways 12 and 13 represent a groove or channel of T-form as shown most clearly in Fig. 7. While one of these T-ways 12—13 is sufficient it is preferred however to provide opposite walls of the opening 10 with ways of such form, the lateral way 13 of one projecting inwardly and a lateral way 13 of the other projecting outwardly. This is indicated most clearly in Fig. 1. The ways 12 and 13 consist of grooves or channels formed in the wall of the opening 10. An end of each of the ways 12 is adapted to receive a seat 14 which is designed to receive a pin 15 by means of which the axle box 11 is secured in the hub of the wheel 3. A key 16 is slipped into the lateral way 13 and its inner end engages the pin 15 and prevents displacement thereof. The seat 14 prevents the pin 15 from wearing upon the hub. These elements, namely the seat 14 and pin 15 may be easily replaced when worn by similar parts.

The axle box or bearing block 11 is formed in the faces adjacent the walls of the opening 10 having the T-ways with ways of L-form, which correspond with parts of the said T-ways. Referring to Fig. 6 it will be observed that the box 11 is formed in opposite faces with relatively lateral ways 17 and from the inner end of each way 17 a way 18 projects the same constituting a seat to receive a portion of the pin 15. When the box or bearing block 11 is in position the ways 17 and 18 thereof register with corresponding portion of the T-ways 12—13. The seat 14 occupies an end portion of the way 12 and the depression formed therein registers with the way 18 and forms an opening to snugly receive the pin 15 which forms the locking means between the axle box or bearing block and the hub portion of the wheel. The lateral ways 13 and 17 register and are adapted to snugly receive the key 16 whereby the locking pin 15 is retained in operative position. When the key 16 is withdrawn the locking pin 15 may be permitted to leave the opening formed by the grooves in the seat 14 and box 11 and enter the key way opening thereby releasing the axle box which may be removed from the opening 10 from either side of the wheel. The end of the locking pin projects slightly into the key way formed by the grooves 13 and 17 and is provided with an annular groove 19 which is adapted to receive the end of a suitable instrument whereby the locking pin may be withdrawn from its opening when required. Each of the keys 16 is provided in its outer end with cuts 20 to receive a suitable instrument or tool to admit of withdrawing of the key when required.

The axle box or bearing block 11 is formed with a central opening in which is rotatably fitted a bearing 21 which may be of suitable material so as to resist wear. The bearing 21 is in the nature of a sleeve and is pressed into the axle box 11. The outer end of the bearing 21 is formed with an inner annular shoulder 22 which is adapted to be confined between the axle nut 9 and the shoulder formed at the inner end of the reduced portion of the spindle 2 upon which the axle 9 is threaded. In this manner the position of the wheel on the spindle or axle arm 2 is fixed. Obviously the bearing 21 may be replaced when required since it may be forced from the axle box and a new one pressed into position. The bearing 21 has its ends flush with the outer faces of the axle box at opposite sides of the hub portion of the wheel 3.

In assembling the block in the hub the block 11 is first placed about half way in the opening 10. When in this position the seats 14 will be placed in position by placing a small amount of grease thereon so that they will stick in the waves 12 adjacent one end. The pins 15 will now be placed in the waves 18 and the block forced so that its ends will be flush with the wheel. Any suitable pointed instrument may now be used so as to engage the grooves 19 of the pins 15 and force them into engagement with the seats 14. When thus positioned the keys 16 will be placed in position.

A plate 23 is placed against the outer side of the hub portion of the wheel and is formed with an internal threaded collar 24 which receives a plug 25 the inner end of the latter being recessed to receive a portion of the axle nut 9 and the threaded end of the spindle 2 upon which said axle nut is mounted. A plate 26 is placed against the inner side of the hub portion of the wheel and is provided with an externally threaded collar 27 which receives a cap 28. The inner and outer plates 26 and 23 are secured to the hub portion of the wheel by means of bolts 29.

A helical spring 30 of conical form is mounted upon the inner end of the spindle 2 and exerts a pressure upon a packing 31 which is placed against the plate 26 and surrounds the opening therein through which the spindle 2 passes. As the surfaces sustaining the wear become worn adjustment may be made to bring new surfaces in position for sustaining the wear and load, thereby increasing the period of service of the axle and wheel.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the invention as claimed.

The cap 28 is prevented from becoming loose by suitable fastening means. An annular flange 33 formed on the plate 26 is provided with a plurality of openings to receive a wire 32 which is adapted to engage any one of a number of projections 34 formed on the outer side of the cap 28. The plug 25 is likewise prevented from becoming loose by means of a wire 35 which passes through one of a series of openings formed in the collar 24 and is adapted to engage one of a number of notches formed in the outer edge of the plug 25.

Having thus fully described my invention what I claim as new and desire to secure by Letters Patent, is:—

1. In a wheel construction, a hub having an angular opening and a T-way in a wall of the opening, an axle box substantially square in cross section, removably fitted in the opening of the hub and having an L-way to match with a portion of the T-way, a pin insertable in a portion of the matching ways and a key insertable transversely to the wheel in another portion of the matching ways.

2. In-wheel construction, a hub, having an approximately T-way in a wall of its opening, an axle box removably fitted within the hub and formed with a way of approximately L-form to register with a portion of the said T-way, a locking pin insertable through the matching ways and serving to secure the axle box in position, and a key insertable in a portion of the matching ways to retain the locking pin in position.

3. In wheel construction, a hub having an angular opening and having a T-way in a wall of the opening, a seat disposed in a portion of the T-way, an axle box removably fitted in the opening of the hub and having a way of L-form in a side to match a portion of the T-way in a wall of the hub opening, a locking pin insertable in a portion of the matching ways to secure the axle box in position, and having an end portion constructed to receive a removing tool, and a key for retaining the locking pin in position insertable in a portion of the matching ways.

In testimony whereof I affix my signature in presence of two witnesses.

HARRY WALLACE.

Witnesses:
JOHN W. DICKERSON,
JANE A. GAINES.